United States Patent
Hosseini et al.

(10) Patent No.: US 12,363,710 B2
(45) Date of Patent: Jul. 15, 2025

(54) RESOURCE ALLOCATION FOR SIDELINK-ASSISTED UPLINK TRANSMISSION

(71) Applicant: QUALCOMM Incorporated, San Diego, CA (US)

(72) Inventors: Seyedkianoush Hosseini, San Diego, CA (US); Gabi Sarkis, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/199,198

(22) Filed: Mar. 11, 2021

(65) Prior Publication Data

US 2021/0289529 A1  Sep. 16, 2021

Related U.S. Application Data

(60) Provisional application No. 62/990,286, filed on Mar. 16, 2020.

(51) Int. Cl.
*H04W 72/20* (2023.01)
*H04W 72/044* (2023.01)
*H04W 92/18* (2009.01)

(52) U.S. Cl.
CPC ......... *H04W 72/20* (2023.01); *H04W 72/044* (2013.01); *H04W 92/18* (2013.01)

(58) Field of Classification Search
CPC ............. H04W 72/1278; H04W 92/18; H04W 72/044
See application file for complete search history.

(56) References Cited

U.S. PATENT DOCUMENTS

| 11,219,054 B2 | 1/2022 | Gulati et al. |
| 2019/0053204 A1* | 2/2019 | Lien ............ H04L 1/0023 |

(Continued)

FOREIGN PATENT DOCUMENTS

| CN | 110876202 A | 3/2020 |
| WO | 2018204131 | 11/2018 |

OTHER PUBLICATIONS

ERICSSON: "Feature Lead Summary#3 on Resource Allocation for NR Sidelink Mode1", 3GPP Draft, R1-1911713, 3GPP TSG-RAN WG1 Meeting #98bis, —Feature Lead Summary on Resource Allocation for NR Sidelink Mode1 V3, 3rd Generation Partnership Project (3GPP), Mobile Competence Centre, 650, Route Des Lucioles, F-06921 vol. RAN WG1. No. Chongqing, China, Oct. 14, 2019-Oct. 20, 2019, Oct. 22, 2019 (Oct. 22, 2019), XP051798955, 53 Pages, Retrieved from the Internet: URL:https://ftp.3gpp.org/tsg_ran/WG1_RL1/TSGR1_98b/Docs/R1-1911713.zip R1-1911713-Feature Lead Summary on Resource Allocation for NR Sidelink Mode 1 v3.docx [retrieved on Oct. 22, 2019] pp. 3.5,7,8 pp. 14, 15 pp. 31-33.

(Continued)

*Primary Examiner* — Parth Patel
(74) *Attorney, Agent, or Firm* — Harrity & Harrity, LLP

(57) ABSTRACT

Various aspects of the present disclosure generally relate to wireless communication. In some aspects, a base station may select, on a sidelink of a user equipment (UE), a channel for sidelink-assisted feedback to be transmitted by the UE, wherein the sidelink-assisted feedback is associated with uplink control information (UCI) or aperiodic channel state information feedback; and transmit, to the UE, an indication of a resource allocation associated with the selected channel for the sidelink-assisted feedback. Numerous other aspects are provided.

30 Claims, 8 Drawing Sheets

(56) References Cited

U.S. PATENT DOCUMENTS

| | | | |
|---|---|---|---|
| 2019/0053226 A1* | 2/2019 | Xiong | H04W 72/1268 |
| 2020/0029318 A1* | 1/2020 | Guo | H04L 1/1819 |
| 2020/0052835 A1* | 2/2020 | Xiong | H04B 7/0632 |
| 2020/0178216 A1* | 6/2020 | Huang | H04W 72/02 |
| 2020/0229145 A1* | 7/2020 | Kang | H04W 72/02 |
| 2021/0127402 A1* | 4/2021 | Lee | H04W 72/10 |
| 2021/0203468 A1* | 7/2021 | Yi | H04W 52/0229 |
| 2021/0289529 A1* | 9/2021 | Hosseini | H04L 1/0026 |
| 2021/0377931 A1* | 12/2021 | Zhang | H04L 5/0048 |
| 2022/0006571 A1* | 1/2022 | Basu Mallick | H04W 72/0406 |
| 2022/0007335 A1* | 1/2022 | Feng | H04W 72/02 |
| 2022/0060286 A1* | 2/2022 | Yoshioka | H04L 1/1864 |
| 2022/0085923 A1* | 3/2022 | Ye | H04W 72/02 |
| 2022/0094472 A1* | 3/2022 | Hwang | H04L 1/0055 |
| 2022/0095279 A1* | 3/2022 | Hwang | H04W 72/0446 |
| 2022/0095280 A1* | 3/2022 | Farag | H04W 28/26 |
| 2022/0103292 A1* | 3/2022 | Hwang | H04W 72/12 |
| 2022/0104126 A1* | 3/2022 | Lee | H04W 52/0219 |
| 2022/0104209 A1* | 3/2022 | Lee | H04W 72/02 |
| 2022/0109527 A1* | 4/2022 | Hwang | H04L 1/1864 |
| 2022/0110067 A1* | 4/2022 | Ryu | H04L 5/0051 |
| 2022/0110097 A1* | 4/2022 | Zhao | H04W 72/02 |

OTHER PUBLICATIONS

Huawei, et al., "NR DCI and UCI Design for Resource Allocation Mode 1", 3GPP Draft, R1-1909315, 3GPP TSG RAN WG1 Meeting #98, 3rd Generation Partnership Project (3GPP), Mobile Competence Centre, 650, Route Des Lucioles, F-06921 Sophia-Antipolis Cedex, France vol. RAN WG1, No. Prague, Czech Republic, Aug. 26, 2019-Aug. 30, 2019, Aug. 17, 2019 (Aug. 17, 2019), XP051765922, 7 Pages, Retrieved from the Internet: URL:http://www.3gpp.org/ftp/tsg_ran/WG1_RL1/TSGR1_98/Docs/R1-1909315.zip [retrieved on Aug. 17, 2019] pp. 3-5, pp. 2-4.

International Search Report and Written Opinion—PCT/US2021/022135—ISA/EPO—Jun. 21, 2021.

LG Electronics: "Discussion on NR Sidelink Resource Allocation for Mode 1", 3GPP Draft, R1-2001153, 3GPP TSG RAN WG1 #100, 3rd Generation Partnership Project (3GPP), Mobile Competence Centre, 650, Route Des Lucioles, F-06921 Sophia-Antipolis Cedex, France, vol. RAN WG1. No. E-Meeting, Feb. 24, 2020-Mar. 6, 2020, Feb. 18, 2020 (Feb. 18, 2020), XP051853690, 30 Pages, Retrieved from the Internet: URL:https://ftp.3gpp.org/tsg_ran/WG1_RL1/TSGR1_100_e/Docs/R1-2001153.zip R1-2001153 Discussion on resource allocation for mode 1_LGE. DOCX [retrieved on Feb. 18, 2020] pp. 6-8, 9, pp. 14,27.

VIVO: "Discussion on Mode 1 Resource Allocation Mechanism", 3GPP Draft, 3GPP TSG RAN WG1 #98, R1-1908149_Discussion on Mode 1 Resource Allocation Mechanism, 3rd Generation Partnership Project (3GPP), Mobile Competence Centre, 650, Route Des Lucioles, F-06921 Sophia-Antipolis Cede, vol. RAN WG1. No. Prague. CZ, Aug. 26,2019-Aug. 30, 2019, Aug. 17, 2019 (Aug. 17, 2019), XP051764768, 15 Pages, Retrieved from the Internet: URL:http://www.3gpp.org/ftp/tsg_ran/WG1_RL1/TSGR1_98/Docs/R1-1908149.zip [retrieved on Aug. 17, 2019] pp. 3,4, 7-9 pp. 11,14.

\* cited by examiner

RESOURCE ALLOCATION FOR SIDELINK-ASSISTED UPLINK TRANSMISSION

CROSS-REFERENCE TO RELATED APPLICATION

This Patent Application claims priority to U.S. Provisional Patent Application No. 62/990,286, filed on Mar. 16, 2020, entitled "RESOURCE ALLOCATION FOR SIDELINK-ASSISTED UPLINK TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for resource allocation for a sidelink-assisted uplink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a base station, may include selecting, on a sidelink of a user equipment (UE), a channel for sidelink-assisted feedback to be transmitted by the UE, wherein the sidelink-assisted feedback is associated with UCI or aperiodic channel state information feedback; and transmitting, to the UE, an indication of a resource allocation associated with the selected channel for the sidelink-assisted feedback.

In some aspects, a method of wireless communication, performed by a user equipment, may include receiving an indication of a resource allocation associated with a selected channel for sidelink-assisted feedback, wherein the sidelink-assisted feedback is associated with UCI or aperiodic channel state information feedback; and transmitting the sidelink-assisted feedback on the resource allocation.

In some aspects, a base station for wireless communication may include a memory and one or more processors operatively coupled to the memory. The memory and the one or more processors may be configured to select, on a sidelink of a UE, a channel for sidelink-assisted feedback to be transmitted by the UE, wherein the sidelink-assisted feedback is associated with UCI or aperiodic channel state information feedback; and transmit, to the UE, an indication of a resource allocation associated with the selected channel for the sidelink-assisted feedback.

In some aspects, a UE for wireless communication may include a memory and one or more processors operatively coupled to the memory. The memory and the one or more processors may be configured to receive an indication of a resource allocation associated with a selected channel for sidelink-assisted feedback, wherein the sidelink-assisted feedback is associated with UCI or aperiodic channel state information feedback; and transmit the sidelink-assisted feedback on the resource allocation.

In some aspects, a non-transitory computer-readable medium may store one or more instructions for wireless communication. The one or more instructions, when executed by one or more processors of a base station, may cause the one or more processors to select, on a sidelink of a UE, a channel for sidelink-assisted feedback to be transmitted by the UE, wherein the sidelink-assisted feedback is associated with UCI or aperiodic channel state information feedback; and transmit, to the UE, an indication of a resource allocation associated with the selected channel for the sidelink-assisted feedback.

In some aspects, a non-transitory computer-readable medium may store one or more instructions for wireless communication. The one or more instructions, when executed by one or more processors of a UE, may cause the one or more processors to receive an indication of a resource allocation associated with a selected channel for sidelink-assisted feedback, wherein the sidelink-assisted feedback is associated with UCI or aperiodic channel state information feedback; and transmit the sidelink-assisted feedback on the resource allocation.

In some aspects, an apparatus for wireless communication may include means for selecting, on a sidelink of a UE, a channel for sidelink-assisted feedback to be transmitted by the UE, wherein the sidelink-assisted feedback is associated with UCI or aperiodic channel state information feedback; and means for transmitting, to the UE, an indication of a resource allocation associated with the selected channel for the sidelink-assisted feedback.

In some aspects, an apparatus for wireless communication may include means for receiving an indication of a resource allocation associated with a selected channel for sidelink-assisted feedback, wherein the sidelink-assisted feedback is associated with UCI or aperiodic channel state information feedback; and means for transmitting the sidelink-assisted feedback on the resource allocation.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
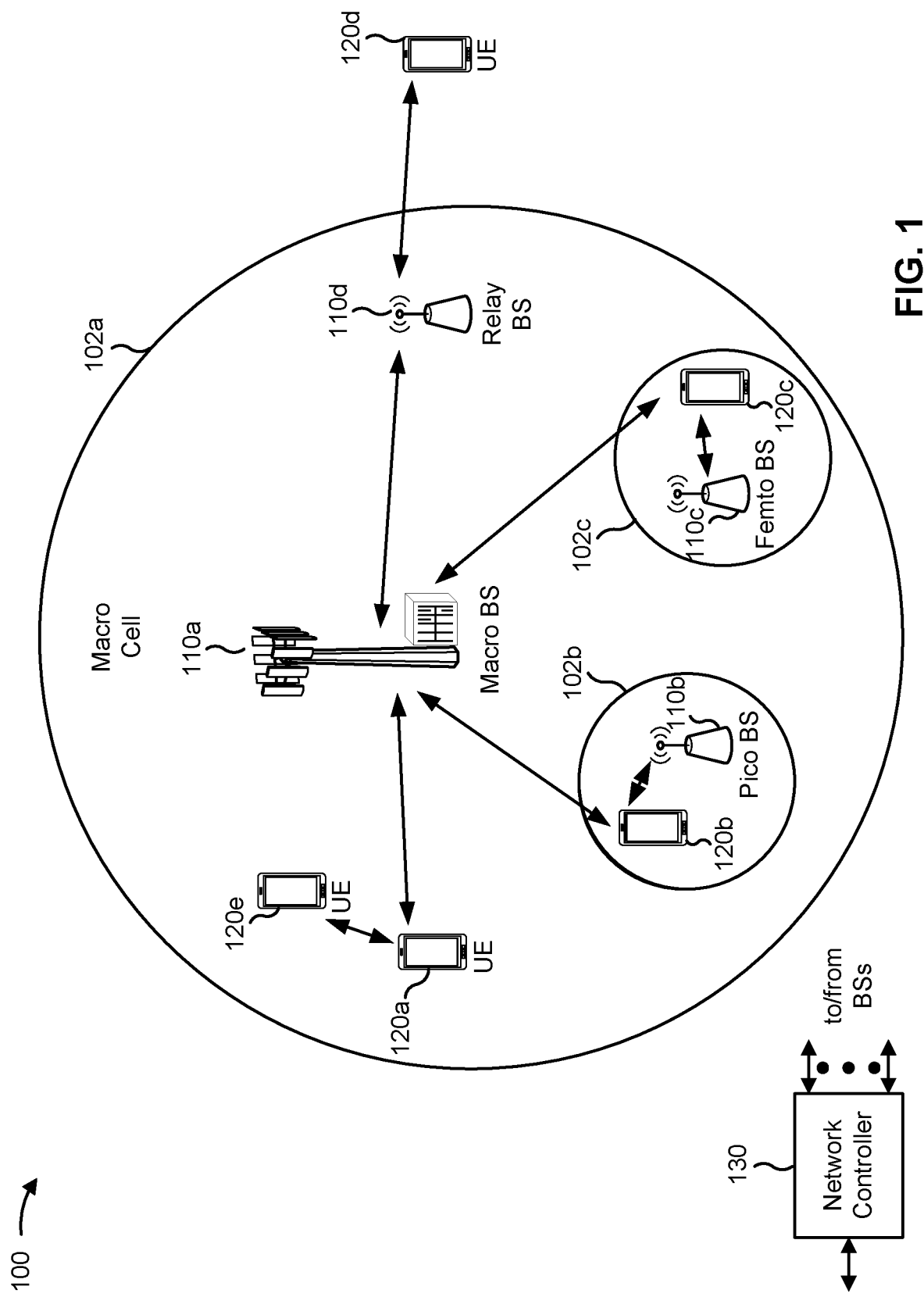
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, a first UE 120 (e.g., UE 120a) may provide a relay service for a second UE (e.g., UE 120e) via a sidelink. For example, sidelink communication can occur between a remote UE 120 (e.g., UE 120e) and a relay UE 120 (e.g., UE 120a) for data transmission to or from the BS 110. In some aspects, the remote UE 120 may be out of the coverage area of the radio access network so that the remote UE 120 cannot communicate directly with the BS 110. In such a case, relays can be deployed to extend network coverage. In some aspects, the remote UE 120 may be within the coverage area of the BS 110. In such a case, the relay UE 120 may improve performance of the remote UE 120 and network capacity by enabling the remote UE to perform sidelink and radio access (e.g., uplink/downlink) communications.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
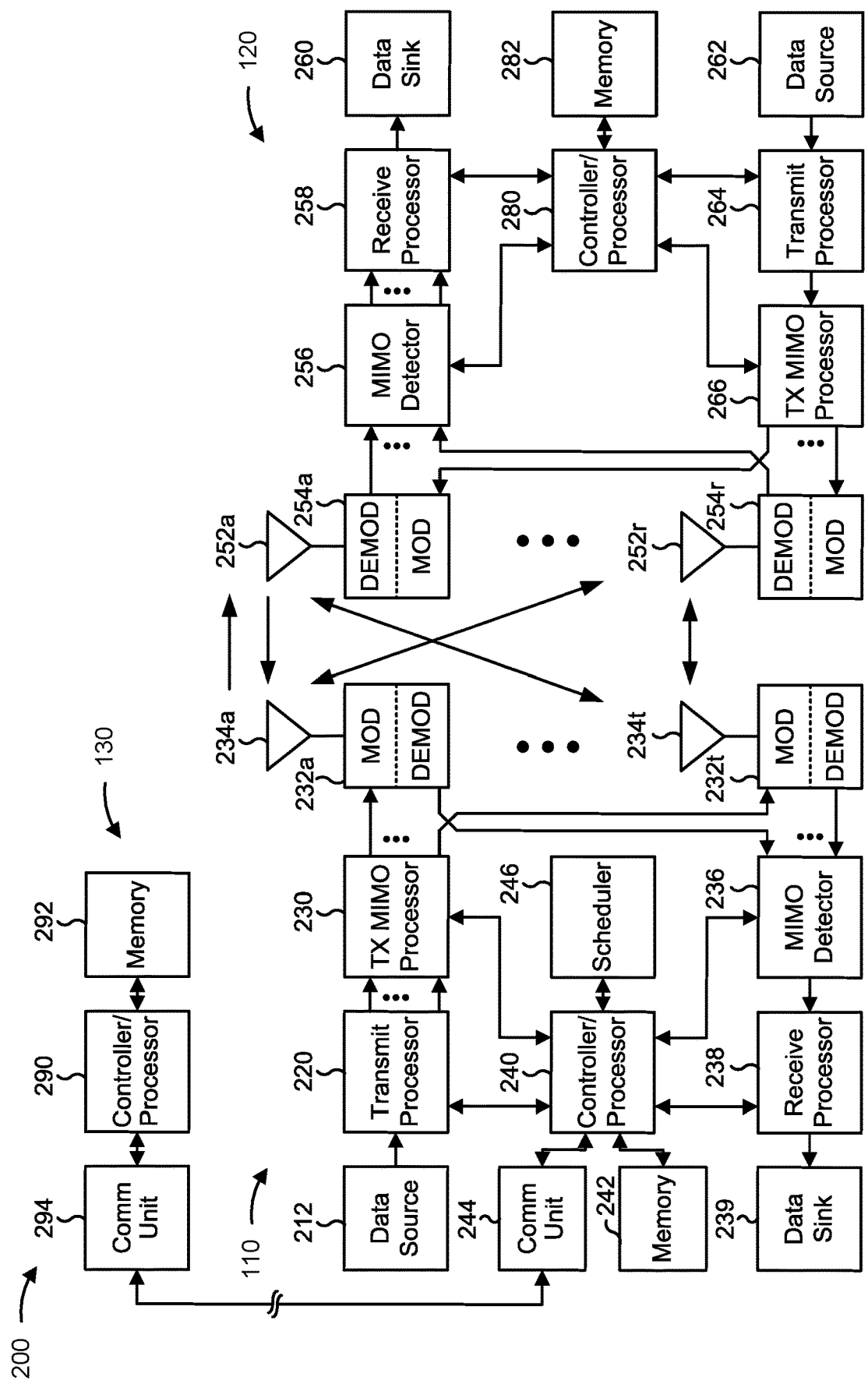
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with resource allocation for sidelink-assisted uplink feedback, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving an indication of a resource allocation associated with a selected channel for sidelink-assisted feedback, wherein the sidelink-assisted feedback is associated with uplink control information (UCI) or aperiodic channel state information feedback; means for transmitting the sidelink-assisted feedback on the resource allocation; means for transmitting the sidelink-assisted feedback using medium access control signaling; means for transmitting the sidelink-assisted feedback using sidelink control information; means for identifying the physical sidelink feedback channel resource; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for selecting, on a sidelink of a UE, a channel for sidelink-assisted feedback to be transmitted by the UE, wherein the sidelink-assisted feedback is associated with UCI or aperiodic channel state information feedback; means for transmitting, to the UE, an indication of a resource allocation associated with the selected channel for the sidelink-assisted feedback; means for receiving the sidelink-assisted feedback using medium access control signaling; means for receiving the sidelink-assisted feedback using sidelink control information; means for identifying the physical sidelink feedback channel resource; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
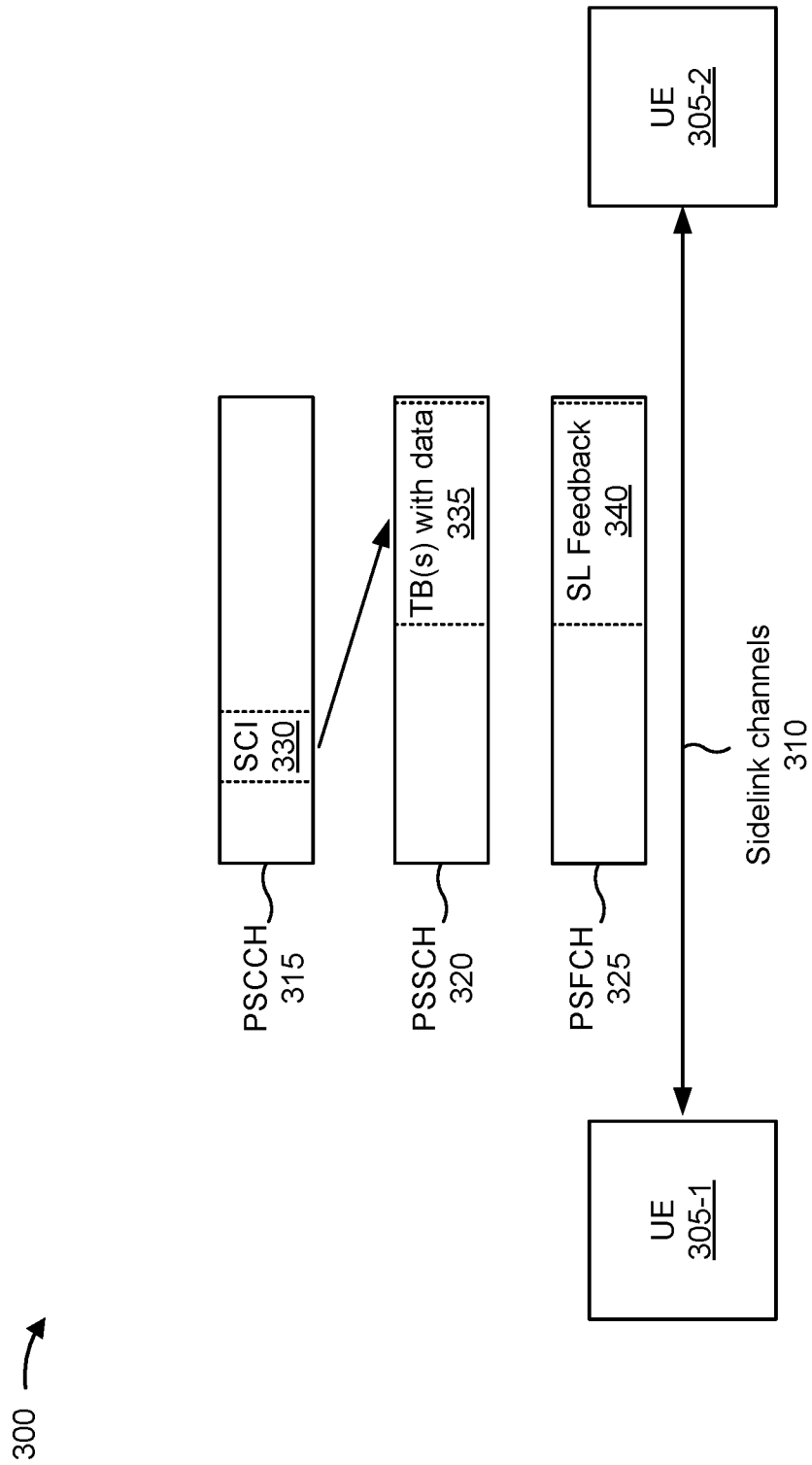
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to person (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like. In some aspects, a physical sidelink broadcast channel (PSBCH) may be used to broadcast information on the sidelink. One or more of the one or more sidelink channels may be selected and used to transmit sidelink-assisted feedback, as described elsewhere herein.

In some aspects, the one or more sidelink channels 310 may use resource pools. For example, a scheduling assignment (e.g., included in SCI 330) may be transmitted in sub-channels using specific resource blocks (RBs) across time. Sidelink communications take place in resource pools. Resource pools may be defined for transmission and reception. A resource pool may comprise sub-channels in frequency and slots in time. The minimum resource allocation unit is a sub-channel in frequency, and the resource allocation in time is a slot. Some slots may not be available for the sidelink. As described elsewhere herein, a subset of resource pools may be associated with sidelink-assisted feedback transmission, and resources of the subset of resource pools may be used to transmit sidelink-assisted feedback.

In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
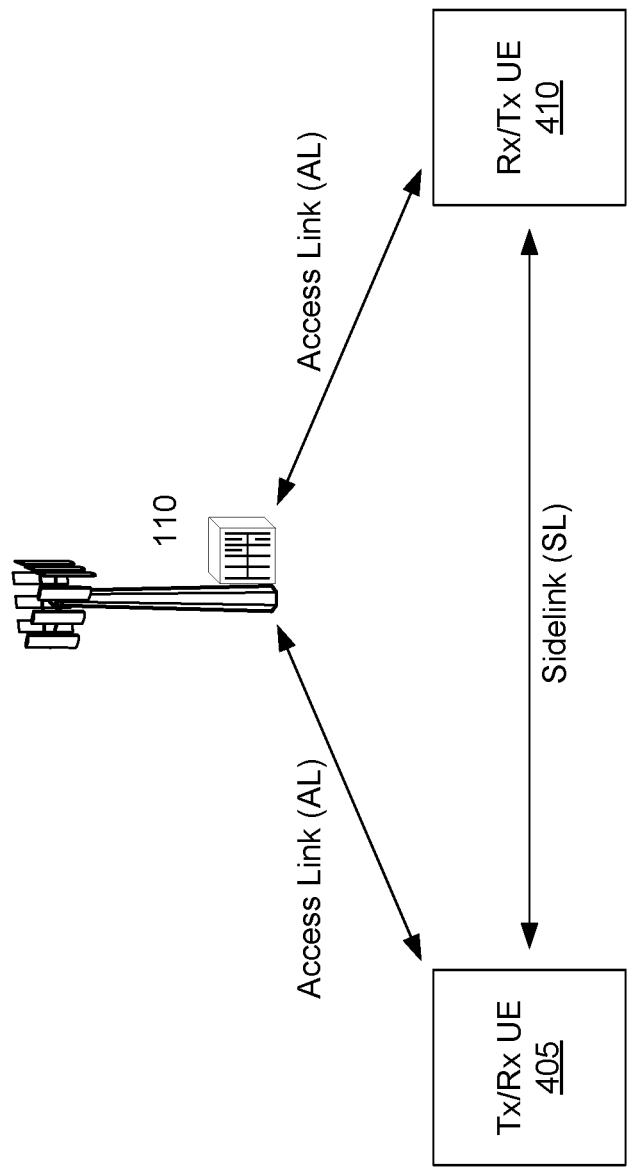
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, an access link communication (e.g., an uplink communication) may be transmitted on a selected channel of a sidelink as a sidelink communication, as described elsewhere herein. Such a transmission may be referred to as sidelink-assisted feedback.

As indicated above, FIG. 4 is provided as an example. Other examples may differ from what is described with respect to FIG. 4.

Figure 5:
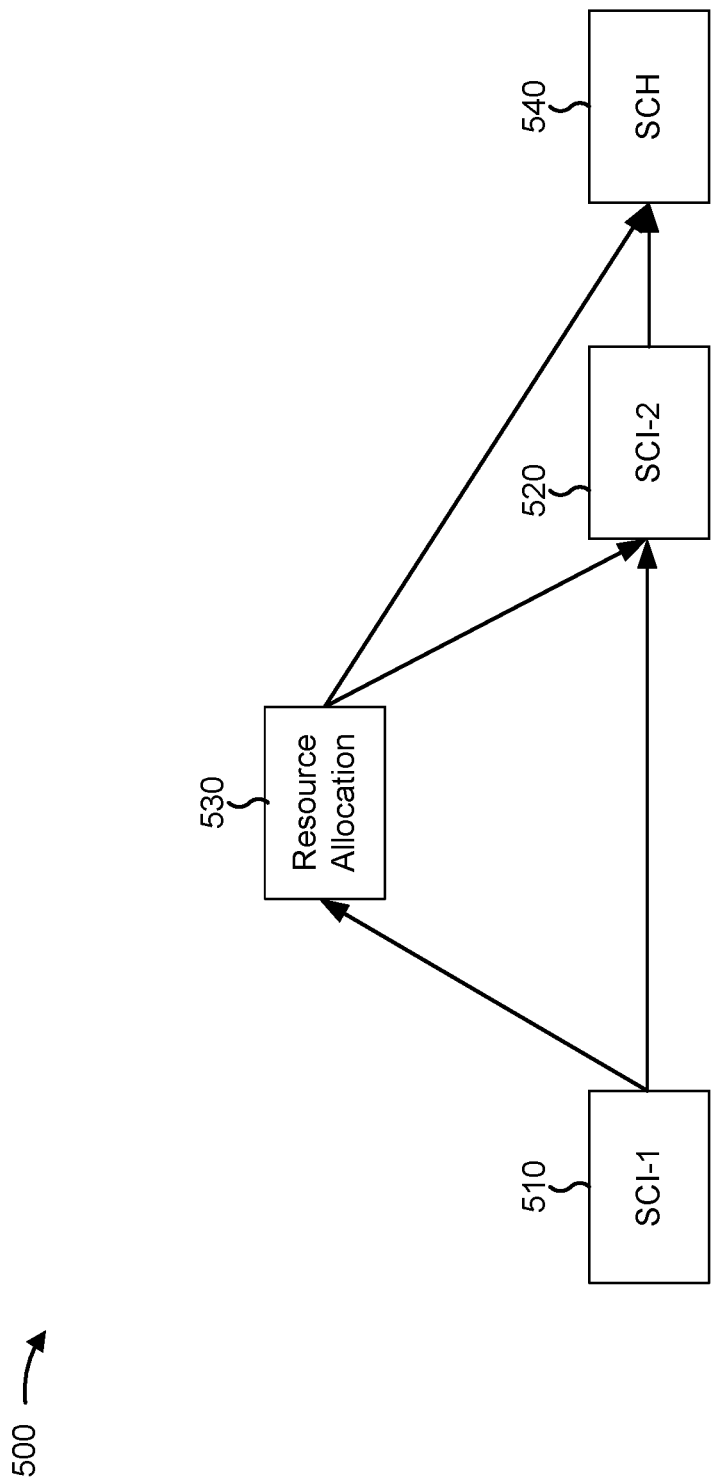
FIG. 5 is a diagram illustrating an example of two-stage sidelink control information, in accordance with the present disclosure.

FIG. 5 is a diagram illustrating an example 500 of two-stage sidelink control information (SCI), in accordance with the present disclosure. SCI may be provided in a first stage and a second stage, shown by reference numbers 510 and 520. The first stage may be referred to as SCI-1 and the second stage may be referred to as SCI-2. SCI-1 may be transmitted on a PSCCH. SCI-1 may include a resource allocation shown by reference number 530, and may include information for decoding SCI-2 (e.g., a format of SCI-2 and/or other information). The resource allocation may indicate resources for SCI-2 and/or a shared channel (SCH) shown by reference number 540. SCI-2 may be transmitted on a PSSCH. SCI-2 may include information for decoding the SCH. SCI-1 and/or SCI-2 may be encoded and/or decoded using a physical downlink control channel (PDCCH) polar coding/decoding chain.

In some aspects, SCI-2 may be mapped to contiguous resource blocks (RBs) in the PSSCH, starting from a first symbol with a PSSCH demodulation reference signal (DMRS). In some aspects, SCI-2 may be scrambled separately from the SCH. In some aspects, SCI-2 may be modulated using quadrature phase shift keying (QPSK). Since the format of SCI-2 may be indicated by SCI-1, a recipient of SCI-2 may not perform blind decoding of SCI-2, thereby conserving computing resources.

As indicated above, FIG. 5 is provided as an example. Other examples may differ from what is described with regard to FIG. 5.

A remote UE may utilize the services of a relay UE to relay communications between the remote UE and a BS. This may be beneficial for cases when coverage of the remote UE is limited, as well as in cases when the remote UE is covered by a radio access network of a BS (e.g., in cases when the remote UE has a Uu link with the BS). For example, if the Uu link is congested, multiple sidelink communications, between remote UEs and the associated relay UEs, can be scheduled. Considering that these multiple sidelink communications do not interfere with each other, network capacity can be increased. Furthermore, in terms of power consumption, since the relay UE may be expected to be closer to the remote UE than the BS is to the remote UE, it may be more desirable if the uplink transmissions are relayed to the BS (since transmitting from the remote UE to the relay UE may use less power than transmitting from the remote UE to the BS). For example, the amount of power needed for each channel may be dependent on the target block error rate (BLER), the payload, and the coding rate. In general, more power is needed for transmitting larger packets, such as an uplink shared channel (UL-SCH) on a PUSCH, than is needed for transmitting smaller packets, such as a set of bits of a hybrid automatic repeat request (HARQ) acknowledgment (ACK) on the PUCCH.

In some cases, a sidelink transmission may be used to assist with transmission of uplink feedback. This may be referred to as sidelink-assisted uplink feedback or sidelink-assisted feedback. Sidelink-assisted uplink feedback may improve the robustness of such feedback and may reduce usage of remote UE resources associated with transmitting the uplink feedback at a higher transmit power. In some cases, the sidelink resource and/or channel to be used for the sidelink-assisted feedback may be unclear. For example, a relay UE that is to relay the sidelink-assisted feedback may or may not be aware of the sidelink resource and/or channel to be used for the sidelink-assisted feedback. As another example, the size of the sidelink-assisted feedback may mean that certain channels are more suitable or usable than other channels for transmission of the sidelink-assisted feedback.

Some techniques and apparatuses described herein provide selection of a channel, on a sidelink of a remote UE, for sidelink-assisted feedback to be transmitted by the remote UE. For example, a base station may select the channel, and may provide an indication of resources associated with the channel to be used to transmit the sidelink-assisted feedback. The resources may be indicated implicitly (e.g., relative to another channel or another transmission of the remote UE) or explicitly (e.g., in scheduling information, control information, or another form of signaling transmitted to the remote UE). Thus, ambiguity in resource allocation for sidelink-assisted feedback transmission may be reduced.

Furthermore, performance of the network is improved by successful utilization of the sidelink between the remote UE and the relay UE. Still further, selecting an appropriate channel for the sidelink-assisted feedback improves efficiency and performance of the sidelink.

Figure 6:
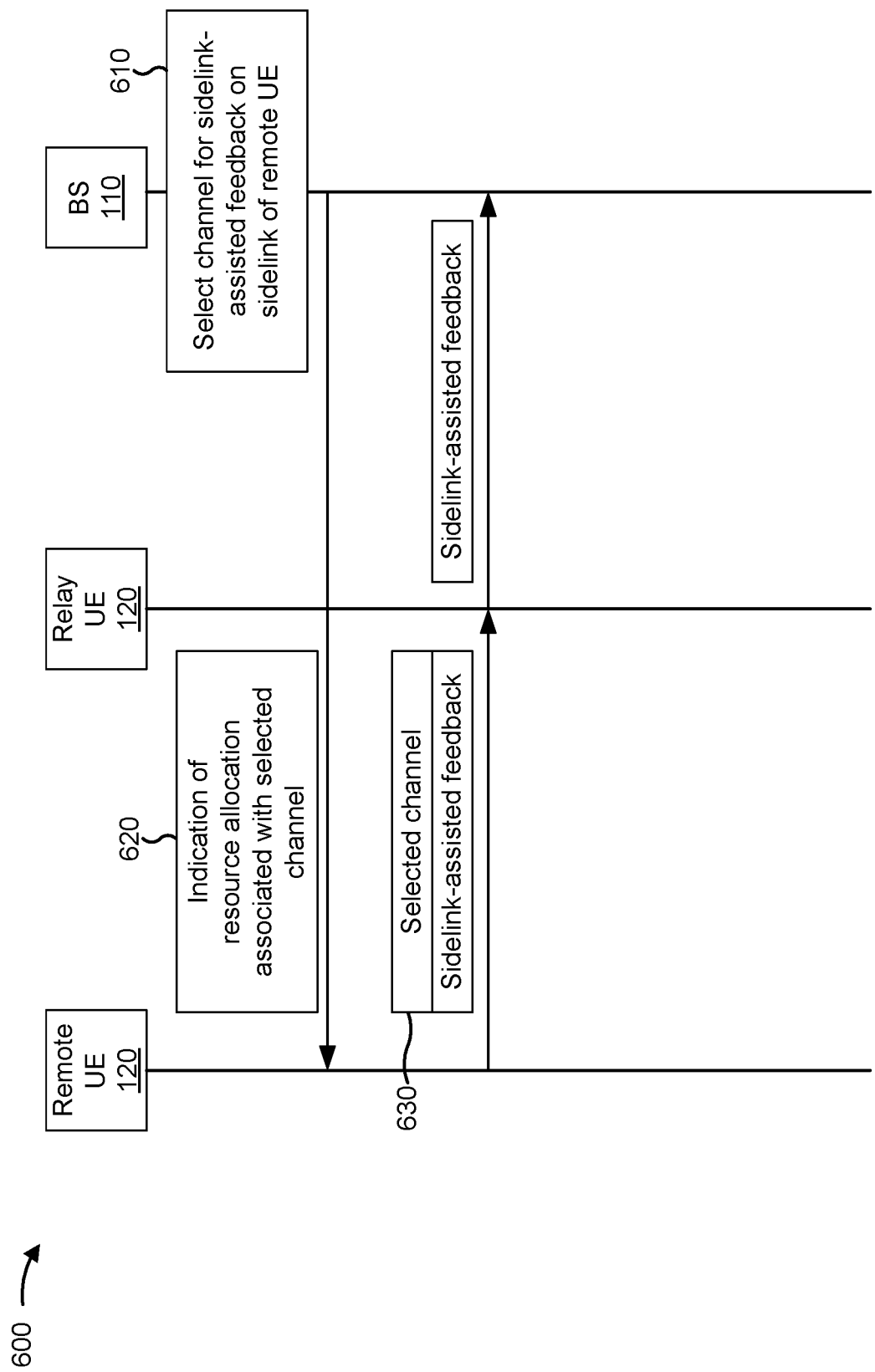
FIG. 6 is a diagram illustrating an example of selection of a link for resource allocation for a sidelink-assisted uplink transmission, in accordance with the present disclosure.

FIG. 6 is a diagram illustrating an example 600 of selection of a link for resource allocation for a sidelink-assisted uplink transmission, in accordance with the present disclosure. As shown, example 600 includes a remote UE 120 (e.g., UE 305, UE 405, UE 410), a relay UE 120 (e.g., UE 305, UE 405, UE 410), and a BS 110.

As shown in FIG. 6, and by reference number 610, the BS 110 may select a channel for sidelink-assisted feedback on a sidelink of the remote UE 120 (e.g., a sidelink between the remote UE 120 and the relay UE 120). The channel may be a physical channel on the sidelink between the remote UE 120 and the relay UE 120, such as a PSSCH, a PSCCH, a PSFCH, and/or the like. In some aspects, the BS 110 may select the channel based at least in part on a communication type of the sidelink-assisted feedback (e.g., UCI, channel state information (CSI) feedback, a scheduling request, and/or the like), a payload size of the sidelink-assisted feedback, resource availability on one or more channels that can be selected, and/or the like. In some aspects, the selection of the channel may be implicit. For example, the channel to be selected may be specified in a wireless telecommunication standard, based at least in part on a condition at the BS 110 or one of the UEs 120, or the like. The sidelink-assisted feedback may include, for example, UCI, uplink data, an A-CSI report, a scheduling request (SR), and/or the like. An SR is a request for uplink resources, such as an uplink grant, so that the remote UE 120 can transmit a communication on the uplink.

In some aspects, the BS 110 may select a PSSCH as the selected channel. In this case, the sidelink-assisted feedback may be transmitted using a PSSCH resource. UCI to be transmitted on the PSSCH may be transmitted using a medium access control (MAC) control element (CE) on the PSSCH resource, such as a MAC-CE carried by a PSSCH. In some aspects, the BS 110 may select SCI (e.g., SCI-2) as the selected channel. For example, SCI-1 may indicate a particular format of SCI-2. The particular format may be associated with (e.g., configured for) carrying UCI associated with a Uu link (e.g., sidelink-assisted feedback). A Uu link may be referred to herein as an access link between a UE and a BS. In this case, the remote UE 120 may not transmit a PSSCH, or may transmit a PSSCH with a medium access control (MAC) protocol data unit (PDU) that includes all zeroes or no useful content.

In some aspects, the BS 110 may select a PSFCH as the selected channel. This may be particularly beneficial if the relay UE 120 has information indicating which resources, on the sidelink, are to be used by the remote UE 120. Selecting the PSFCH may be beneficial for smaller payload sizes, whereas selecting the PSSCH or the SCI-2 may be more beneficial for larger payload sizes. Furthermore, selecting the PSSCH or the SCI-2 may be beneficial if the relay UE 120 does not have information indicating a sidelink resource allocation of the remote UE 120. For example, if the relay UE 120 does not have access to the sidelink resource allocation of the remote UE 120, then the relay UE 120 may monitor all PSCCHs/PSSCHs on a set of resource pools.

As shown by reference number 620, the BS 110 may provide, to the remote UE 120 (e.g., via the Uu interface or via the relay UE 120), an indication of a resource allocation associated with the selected channel. In some aspects, the BS 110 may explicitly indicate the selected channel to the remote UE 120. In some aspects, the BS 110 may implicitly indicate the selected channel to the remote UE 120 (e.g., based at least in part on the resource allocation being associated with the selected channel).

In some aspects, the indication of the resource allocation may be implicit. As an example, the first configured occasion for the sidelink after a PDCCH (or a control resource set (CORESET) that includes the PDCCH) or PDSCH that carries the indication and/or that schedules the sidelink-assisted feedback may be used for sidelink transmission. A gap between the PDCCH/CORESET/PDSCH and the occasion for sidelink transmission may take into account a minimum processing timeline capability of the remote UE 120. In this case, a time-domain resource, or both a time-domain resource and a frequency resource (e.g., one or more subchannels) can be configured for this purpose for a set of remote UEs 120 associated with a relay UE 120. The implicit indication may also be used if the PSFCH is used as a channel to carry the sidelink-assisted feedback.

In some aspects, the indication may include downlink control information (DCI). For example, the DCI may indicate the resource allocation. In some aspects, the DCI may be associated with a format used to indicate a link, from a sidelink or an uplink for the sidelink-assisted feedback. For example, the format may be specific to indicating a link (e.g., uplink to the BS 110 or sidelink via the relay UE 120) for the sidelink-assisted feedback. In some aspects, the DCI may indicate a time resource (e.g., a time gap between the DCI and the resource allocation) and a frequency resource (e.g., one or more subchannels) to use. In some aspects, the DCI may indicate the time resource, and frequency resources may be indicated or determined semi-statically. In some aspects, the frequency resource may be based at least in part on the time resource for the sidelink-assisted feedback or a slot in which the indication (e.g., the DCI) is received. In some aspects, the indication may indicate a subchannel carrying the PSCCH and a time gap, and a number of subchannels for a PSSCH transmission and an offset relative to the PSCCH may be configured. In some aspects, a time gap for determining the time resource may be configured. In some aspects, when the selected channel is a PSFCH, the indication may provide information regarding a PSFCH resource and a format for the PSFCH (e.g., a cyclic shift to be used and/or the like).

In some aspects, when the selected channel is a PSFCH, the remote UE 120 may determine the resource allocation based at least in part on a mapping. In such a case, the BS 110 may not transmit an indication to the remote UE 120, or the indication transmitted to the UE 120 may not indicate the resource allocation. For example, the remote UE 120 may store information indicating a mapping between uplink resources and PSFCH resources. The mapping may be based at least in part on a relation between two or more of a slot or subslot used for a PUCCH, a PUCCH resource set, a PUCCH format, a timing parameter (e.g., K0, K1, K2, and/or the like), a time gap and/or subchannel used for the PSFCH, and/or the like. The relation may be configured for the remote UE 120 as part of the remote UE 120's PUCCH configuration. The remote UE 120 may identify a resource allocation for the PSFCH by reference to a PUCCH associated with the sidelink-assisted feedback and the relation. This may conserve signaling resources that would otherwise be used to dynamically signal the indication.

In some aspects, the sidelink between the remote UE 120 and the relay UE 120 may be associated with a plurality of resource pools. A subset (e.g., a proper subset) of resource pools, of the plurality of resource pools, may be configured for transmitting sidelink-assisted feedback. Within the subset of resource pools, a subset of time-domain and frequency-domain resources may be configured as valid for transmitting sidelink-assisted feedback. Thus, the indicated resources (described above) may point to one or more of the valid resources. This may reduce complexity of signaling the resource allocation, thereby conserving air-interface resources and computing resources of the remote UE 120 and the BS 110.

As shown by reference number 630, the remote UE 120 may provide, to the relay UE 120, the sidelink-assisted feedback on the selected channel. The relay UE 120 may relay the sidelink-assisted feedback to the BS 110. Thus, the BS 110 may select a channel and/or determine a resource allocation, on the selected channel, for the sidelink-assisted feedback. The remote UE 120 may use the selected channel to provide the sidelink-assisted feedback to the BS 110 via the relay UE 120. In this way, reliability of the sidelink-assisted feedback is improved, signaling overhead is reduced, and network performance is improved.

As indicated above, FIG. 6 is provided as an example. Other examples may differ from what is described with respect to FIG. 6.

Figure 7:
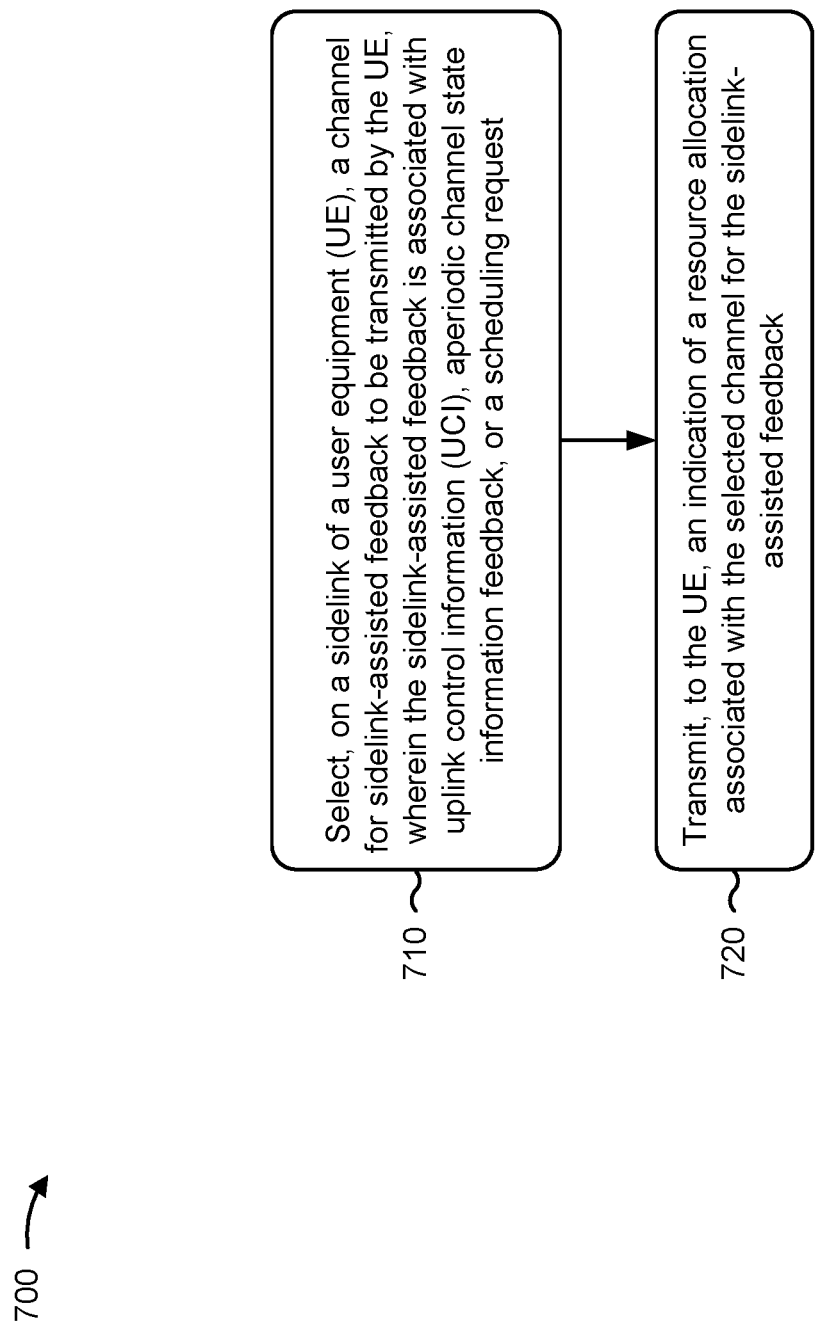
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., BS 110 and/or the like) performs operations associated with resource allocation for a sidelink-assisted uplink transmission.

As shown in FIG. 7, in some aspects, process 700 may include selecting, on a sidelink of a user equipment (UE), a channel for sidelink-assisted feedback to be transmitted by the UE, wherein the sidelink-assisted feedback is associated with uplink control information (UCI), aperiodic channel state information feedback, or a scheduling request (block 710). For example, the base station (e.g., using antenna 234, DEMOD 232, MIMO detector 236, receive processor 238, controller/processor 240, and/or the like) may select, on a sidelink of a UE (e.g., remote UE 120), a channel for sidelink-assisted feedback to be transmitted by the UE, as described above. In some aspects, the sidelink-assisted feedback is associated with UCI, aperiodic channel state information feedback, or a scheduling request.

As further shown in FIG. 7, in some aspects, process 700 may include transmitting, to the UE, an indication of a resource allocation associated with the selected channel for the sidelink-assisted feedback (block 720). For example, the base station (e.g., using controller/processor 240, transmit processor 220, TX MIMO processor 230, MOD 232, antenna 234, and/or the like) may transmit, to the UE, an indication of a resource allocation associated with the selected channel for the sidelink-assisted feedback, as described above.

Process 700 may include additional aspects, such as any single aspect or any combination of aspects described below and/or in connection with one or more other processes described elsewhere herein.

In a first aspect, the selected channel is a physical sidelink shared channel, and the method further comprises: receiving the sidelink-assisted feedback using medium access control signaling.

In a second aspect, alone or in combination with the first aspect, the method further comprises: receiving the sidelink-assisted feedback using sidelink control information.

In a third aspect, alone or in combination with one or more of the first and second aspects, the sidelink control information uses a format associated with carrying UCI on an access link between the UE and the base station.

In a fourth aspect, alone or in combination with one or more of the first through third aspects, the selected channel is a physical sidelink feedback channel.

In a fifth aspect, alone or in combination with one or more of the first through fourth aspects, a physical sidelink feedback channel resource used to transmit the sidelink-assisted feedback is based at least in part on an uplink resource associated with a payload of the sidelink-assisted feedback.

In a sixth aspect, alone or in combination with one or more of the first through fifth aspects, process 700 includes identifying the physical sidelink feedback channel resource based at least in part on at least: a slot or subslot associated with the uplink resource, a resource set associated with the uplink resource, the uplink resource, a physical uplink control channel format associated with the payload, a timing parameter of the sidelink-assisted feedback or the payload, a time gap or frequency resource of the physical sidelink feedback channel resource, or a combination thereof.

In a seventh aspect, alone or in combination with one or more of the first through sixth aspects, identifying the physical sidelink feedback channel resource is based at least in part on a physical uplink control channel configuration associated with the payload.

In an eighth aspect, alone or in combination with one or more of the first through seventh aspects, the indication of the resource allocation is based at least in part on a resource associated with a physical downlink control channel, a control resource set, or a physical downlink shared channel, and a gap between the resource and the resource allocation.

In a ninth aspect, alone or in combination with one or more of the first through eighth aspects, the gap between the resource and the resource allocation is based at least in part on a minimum processing time of the UE.

In a tenth aspect, alone or in combination with one or more of the first through ninth aspects, the resource allocation is specific to the UE based at least in part on the UE being a remote UE on the sidelink.

In an eleventh aspect, alone or in combination with one or more of the first through tenth aspects, the indication of the resource allocation is transmitted via downlink control information (DCI).

In a twelfth aspect, alone or in combination with one or more of the first through eleventh aspects, the DCI is associated with selecting a link for the sidelink-assisted feedback.

In a thirteenth aspect, alone or in combination with one or more of the first through twelfth aspects, the DCI indicates a time resource and a frequency resource for the sidelink-assisted feedback.

In a fourteenth aspect, alone or in combination with one or more of the first through thirteenth aspects, the DCI indicates a time resource for the sidelink-assisted feedback, and a frequency resource for the sidelink-assisted feedback is indicated semi-statically.

In a fifteenth aspect, alone or in combination with one or more of the first through fourteenth aspects, the DCI indicates a time resource for the sidelink-assisted feedback, and a frequency resource for the sidelink-assisted feedback is based at least in part on at least: the time resource, a slot associated with the DCI, or a combination thereof.

In a sixteenth aspect, alone or in combination with one or more of the first through fifteenth aspects, the DCI indicates a frequency resource for the sidelink-assisted feedback and a time gap for determining a time resource for the sidelink-assisted feedback.

In a seventeenth aspect, alone or in combination with one or more of the first through sixteenth aspects, the DCI indicates a physical sidelink feedback channel resource and a physical sidelink feedback channel format for the sidelink-assisted feedback.

In an eighteenth aspect, alone or in combination with one or more of the first through seventeenth aspects, the resource allocation associated with the selected channel for the sidelink-assisted feedback is selected from a resource pool associated with sidelink-assisted feedback, the resource pool is included in a set of resource pools that are associated with sidelink-assisted feedback.

In a nineteenth aspect, alone or in combination with one or more of the first through eighteenth aspects, the resource allocation associated with the selected channel for the sidelink-assisted feedback is selected from a proper subset of a resource pool associated with sidelink-assisted feedback.

In a twentieth aspect, alone or in combination with one or more of the first through nineteenth aspects, the indication of the resource allocation associated with the selected channel for the sidelink-assisted feedback indicates a resource, of the resource pool associated with sidelink-assisted feedback, for the sidelink-assisted feedback.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
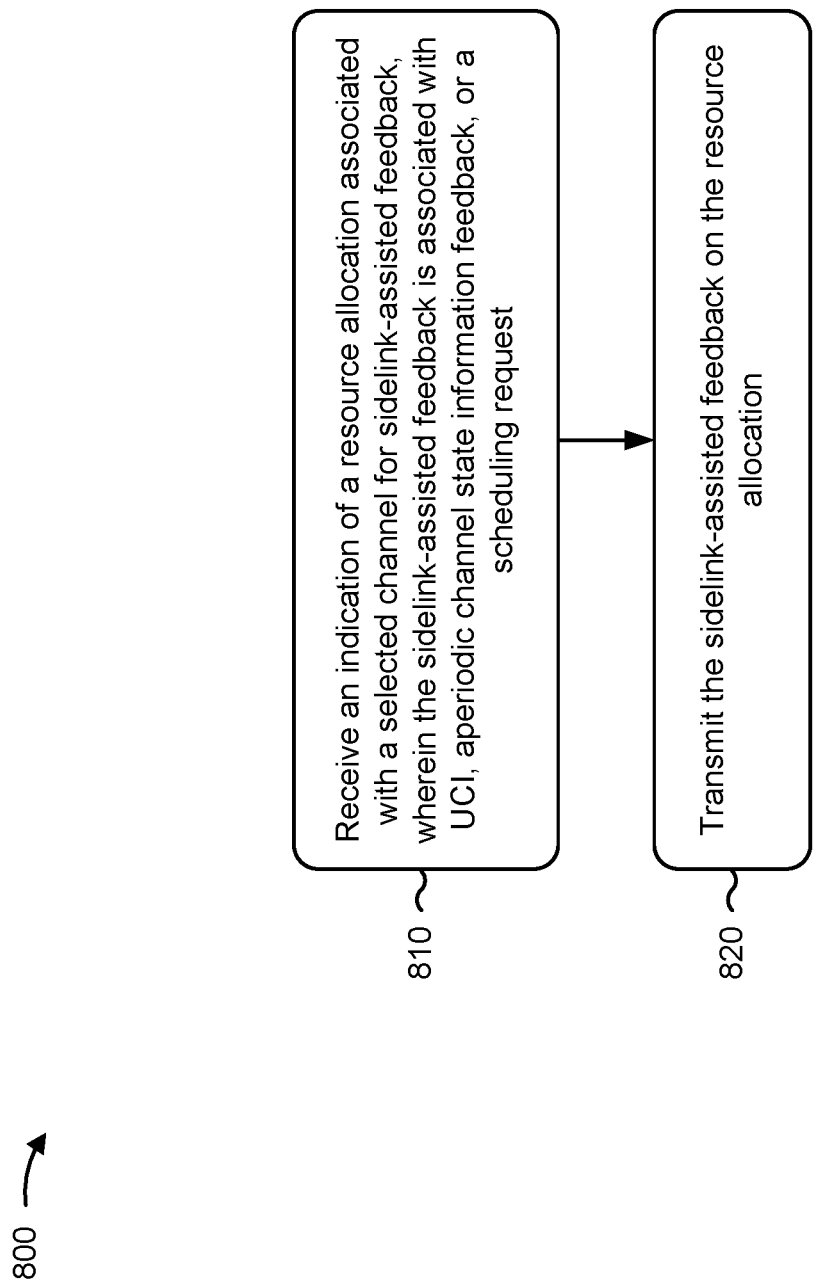
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., remote UE 120, UE 305, and/or the like) performs operations associated with resource allocation a for sidelink-assisted uplink transmission.

As shown in FIG. 8, in some aspects, process 800 may include receiving an indication of a resource allocation associated with a selected channel for sidelink-assisted feedback, wherein the sidelink-assisted feedback is associated with UCI or aperiodic channel state information feedback (block 810). For example, the UE (e.g., using antenna 252, DEMOD 254, MIMO detector 256, receive processor 258, controller/processor 280, and/or the like) may receive an indication of a resource allocation associated with a selected channel for sidelink-assisted feedback, as described above. In some aspects, the sidelink-assisted feedback is associated with UCI or aperiodic channel state information feedback.

As further shown in FIG. 8, in some aspects, process 800 may include transmitting the sidelink-assisted feedback on the resource allocation (block 820). For example, the UE (e.g., using controller/processor 280, transmit processor 264, TX MIMO processor 266, MOD 254, antenna 252, and/or the like) may transmit the sidelink-assisted feedback on the resource allocation, as described above.

Process 800 may include additional aspects, such as any single aspect or any combination of aspects described below and/or in connection with one or more other processes described elsewhere herein.

In a first aspect, the selected channel is a physical sidelink shared channel, and the method further comprises: transmitting the sidelink-assisted feedback using medium access control signaling.

In a second aspect, alone or in combination with the first aspect, the method further comprises: transmitting the sidelink-assisted feedback using sidelink control information.

In a third aspect, alone or in combination with one or more of the first and second aspects, the sidelink control information uses a format associated with carrying UCI on an access link between the UE and the base station.

In a fourth aspect, alone or in combination with one or more of the first through third aspects, the selected channel is a physical sidelink feedback channel.

In a fifth aspect, alone or in combination with one or more of the first through fourth aspects, a physical sidelink feedback channel resource used to transmit the sidelink-assisted feedback is based at least in part on an uplink resource associated with a payload of the sidelink-assisted feedback.

In a sixth aspect, alone or in combination with one or more of the first through fifth aspects, process 800 includes identifying the physical sidelink feedback channel resource based at least in part on at least: a slot or subslot associated with the uplink resource, a resource set associated with the uplink resource, the uplink resource, a physical uplink control channel format associated with the payload, a timing parameter of the sidelink-assisted feedback or the payload, a time gap or frequency resource of the physical sidelink feedback channel resource, or a combination thereof.

In a seventh aspect, alone or in combination with one or more of the first through sixth aspects, identifying the physical sidelink feedback channel resource is based at least in part on a physical uplink control channel configuration associated with the payload.

In an eighth aspect, alone or in combination with one or more of the first through seventh aspects, the indication of the resource allocation is based at least in part on a resource associated with a physical downlink control channel, a control resource set, or a physical downlink shared channel, and a gap between the resource and the resource allocation.

In a ninth aspect, alone or in combination with one or more of the first through eighth aspects, the gap between the resource and the resource allocation is based at least in part on a minimum processing time of the UE.

In a tenth aspect, alone or in combination with one or more of the first through ninth aspects, the resource allocation is specific to the UE based at least in part on the UE being a remote UE on the sidelink.

In an eleventh aspect, alone or in combination with one or more of the first through tenth aspects, the indication of the resource allocation is transmitted via downlink control information (DCI).

In a twelfth aspect, alone or in combination with one or more of the first through eleventh aspects, the DCI is associated with selecting a link for the sidelink-assisted feedback.

In a thirteenth aspect, alone or in combination with one or more of the first through twelfth aspects, the DCI indicates a time resource and a frequency resource for the sidelink-assisted feedback.

In a fourteenth aspect, alone or in combination with one or more of the first through thirteenth aspects, the DCI indicates a time resource for the sidelink-assisted feedback, and a frequency resource for the sidelink-assisted feedback is indicated semi-statically.

In a fifteenth aspect, alone or in combination with one or more of the first through fourteenth aspects, the DCI indicates a time resource for the sidelink-assisted feedback, and a frequency resource for the sidelink-assisted feedback is based at least in part on at least: the time resource, a slot associated with the DCI, or a combination thereof.

In a sixteenth aspect, alone or in combination with one or more of the first through fifteenth aspects, the DCI indicates a frequency resource for the sidelink-assisted feedback and a time gap for determining a time resource for the sidelink-assisted feedback.

In a seventeenth aspect, alone or in combination with one or more of the first through sixteenth aspects, the DCI indicates a physical sidelink feedback channel resource and a physical sidelink feedback channel format for the sidelink-assisted feedback.

In an eighteenth aspect, alone or in combination with one or more of the first through seventeenth aspects, the resource allocation associated with the selected channel for the sidelink-assisted feedback is selected from a resource pool associated with sidelink-assisted feedback, the resource pool is included in a set of resource pools that are associated with sidelink-assisted feedback.

In a nineteenth aspect, alone or in combination with one or more of the first through eighteenth aspects, the resource allocation associated with the selected channel for the sidelink-assisted feedback is selected from a proper subset of a resource pool associated with sidelink-assisted feedback.

In a twentieth aspect, alone or in combination with one or more of the first through nineteenth aspects, the indication of the resource allocation associated with the selected channel for the sidelink-assisted feedback indicates a resource, of the resource pool associated with the sidelink-assisted feedback, for the sidelink-assisted feedback.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving an indication of a resource allocation associated with a selected channel for sidelink-assisted feedback, wherein the sidelink-assisted feedback is associated with uplink control information (UCI) aperiodic channel state information feedback, or a scheduling request; and transmitting the sidelink-assisted feedback on the resource allocation.

Aspect 2: The method of Aspect 1, wherein the selected channel is a physical sidelink shared channel, and wherein the method further comprises: transmitting the sidelink-assisted feedback using medium access control signaling.

Aspect 3: The method of any of Aspects 1-2, wherein the method further comprises: transmitting the sidelink-assisted feedback using sidelink control information.

Aspect 4: The method of Aspect 3, wherein the sidelink control information uses a format associated with carrying UCI on an access link between the UE and a base station.

Aspect 5: The method of any of Aspects 1-4, wherein the selected channel is a physical sidelink feedback channel.

Aspect 6: The method of Aspect 5, wherein a physical sidelink feedback channel resource used to transmit the sidelink-assisted feedback is based at least in part on an uplink resource associated with a payload of the sidelink-assisted feedback.

Aspect 7: The method of Aspect 6, further comprising: identifying the physical sidelink feedback channel resource based at least in part on at least: a slot or subslot associated with the uplink resource, a resource set associated with the uplink resource, the uplink resource, a physical uplink control channel format associated with the payload, a timing parameter of the sidelink-assisted feedback or the payload, a time gap or frequency resource of the physical sidelink feedback channel resource, or a combination thereof.

Aspect 8: The method of Aspect 7, wherein identifying the physical sidelink feedback channel resource is based at least in part on a physical uplink control channel configuration associated with the payload.

Aspect 9: The method of any of Aspects 1-8, wherein the indication of the resource allocation is based at least in part on a resource associated with a physical downlink control channel, a control resource set, or a physical downlink shared channel, and a gap between the resource and the resource allocation.

Aspect 10: The method of Aspect 9, wherein the gap between the resource and the resource allocation is based at least in part on a minimum processing time of the UE.

Aspect 11: The method of any of Aspects 1-10, wherein the resource allocation is specific to the UE based at least in part on the UE being a remote UE on the sidelink.

Aspect 12: The method of any of Aspects 1-11, wherein the indication of the resource allocation is transmitted via downlink control information (DCI).

Aspect 13: The method of Aspect 12, wherein the DCI is associated with selecting a link for the sidelink-assisted feedback.

Aspect 14: The method of Aspect 12, wherein the DCI indicates a time resource and a frequency resource for the sidelink-assisted feedback.

Aspect 15: The method of Aspect 12, wherein the DCI indicates a time resource for the sidelink-assisted feedback, and wherein a frequency resource for the sidelink-assisted feedback is indicated semi-statically.

Aspect 16: The method of Aspect 12, wherein the DCI indicates a time resource for the sidelink-assisted feedback, and wherein a frequency resource for the sidelink-assisted feedback is based at least in part on at least: the time resource, a slot associated with the DCI, or a combination thereof.

Aspect 17: The method of Aspect 12, wherein the DCI indicates a frequency resource for the sidelink-assisted feedback and a time gap for determining a time resource for the sidelink-assisted feedback.

Aspect 18: The method of Aspect 12, wherein the DCI indicates a physical sidelink feedback channel resource and a physical sidelink feedback channel format for the sidelink-assisted feedback.

Aspect 19: The method of any of Aspects 1-18, wherein the resource allocation associated with the selected channel for the sidelink-assisted feedback is selected from a resource pool associated with sidelink-assisted feedback, wherein the resource pool is included in a set of resource pools that are associated with sidelink-assisted feedback, and wherein the indication of the resource allocation indicates the resource pool or a carrier for the resource allocation.

Aspect 20: The method of any of Aspects 1-19, wherein the resource allocation associated with the selected channel for the sidelink-assisted feedback is selected from a proper subset of a resource pool associated with sidelink-assisted feedback.

Aspect 21: The method of Aspect 20, wherein the indication of the resource allocation associated with the selected channel for the sidelink-assisted feedback indicates a resource, of the resource pool associated with the sidelink-assisted feedback, for the sidelink-assisted feedback.

Aspect 22: A method of wireless communication performed by a base station, comprising: selecting, on a sidelink of a user equipment (UE), a channel for sidelink-assisted feedback to be transmitted by the UE, wherein the sidelink-assisted feedback is associated with uplink control information (UCI), aperiodic channel state information feedback, or a scheduling request (SR); and transmitting, to the UE, an indication of a resource allocation associated with the selected channel for the sidelink-assisted feedback.

Aspect 23: The method of Aspect 22, wherein the selected channel is a physical sidelink shared channel, and wherein the method further comprises: receiving the sidelink-assisted feedback using medium access control signaling.

Aspect 24: The method of any of Aspects 22-23, wherein the method further comprises: receiving the sidelink-assisted feedback using sidelink control information.

Aspect 25: The method of Aspect 24, wherein the sidelink control information uses a format associated with carrying UCI on an access link between the UE and the base station.

Aspect 26: The method of any of Aspects 22-25, wherein the selected channel is a physical sidelink feedback channel.

Aspect 27: The method of Aspect 26, wherein a physical sidelink feedback channel resource used to transmit the sidelink-assisted feedback is based at least in part on an uplink resource associated with a payload of the sidelink-assisted feedback.

Aspect 28: The method of Aspect 27, further comprising: identifying the physical sidelink feedback channel resource based at least in part on at least: a slot or subslot associated with the uplink resource, a resource set associated with the uplink resource, the uplink resource, a physical uplink control channel format associated with the payload, a timing parameter of the sidelink-assisted feedback or the payload, a time gap or frequency resource of the physical sidelink feedback channel resource, or a combination thereof.

Aspect 29: The method of Aspect 28, wherein identifying the physical sidelink feedback channel resource is based at least in part on a physical uplink control channel configuration associated with the payload.

Aspect 30: The method of any of Aspects 22-30, wherein the indication of the resource allocation is based at least in part on a resource associated with a physical downlink control channel, a control resource set, or a physical downlink shared channel, and a gap between the resource and the resource allocation.

Aspect 31: The method of Aspect 30, wherein the gap between the resource and the resource allocation is based at least in part on a minimum processing time of the UE.

Aspect 32: The method of any of Aspects 22-31, wherein the resource allocation is specific to the UE based at least in part on the UE being a remote UE on the sidelink.

Aspect 33: The method of any of Aspects 22-32, wherein the indication of the resource allocation is transmitted via downlink control information (DCI).

Aspect 34: The method of Aspect 33, wherein the DCI is associated with selecting a link for the sidelink-assisted feedback.

Aspect 35: The method of Aspect 33, wherein the DCI indicates a time resource and a frequency resource for the sidelink-assisted feedback.

Aspect 36: The method of Aspect 33, wherein the DCI indicates a time resource for the sidelink-assisted feedback, and wherein a frequency resource for the sidelink-assisted feedback is indicated semi-statically.

Aspect 37: The method of Aspect 36, wherein the DCI indicates a time resource for the sidelink-assisted feedback, and wherein a frequency resource for the sidelink-assisted feedback is based at least in part on at least: the time resource, a slot associated with the DCI, or a combination thereof.

Aspect 38: The method of Aspect 36, wherein the DCI indicates a frequency resource for the sidelink-assisted feedback and a time gap for determining a time resource for the sidelink-assisted feedback.

Aspect 39: The method of Aspect 36, wherein the DCI indicates a physical sidelink feedback channel resource and a physical sidelink feedback channel format for the sidelink-assisted feedback.

Aspect 40: The method of any of Aspects 22-39, wherein the resource allocation associated with the selected channel for the sidelink-assisted feedback is selected from a resource pool associated with sidelink-assisted feedback, wherein the resource pool is included in a set of resource pools that are associated with sidelink-assisted feedback, and wherein the indication of the resource allocation indicates the resource pool or a carrier for the resource allocation.

Aspect 41: The method of any of Aspects 22-40, wherein the resource allocation associated with the selected channel for the sidelink-assisted feedback is selected from a proper subset of a resource pool associated with sidelink-assisted feedback.

Aspect 42: The method of Aspect 41, wherein the indication of the resource allocation associated with the selected channel for the sidelink-assisted feedback indicates a resource, of the resource pool associated with sidelink-assisted feedback, for the sidelink-assisted feedback.

Aspect 43: An apparatus for wireless communication at a device, comprising a processor; memory coupled with the processor; and instructions stored in the memory and executable by the processor to cause the apparatus to perform the method of one or more Aspects of Aspects 1-42.

Aspect 44: A device for wireless communication, comprising a memory and one or more processors coupled to the memory, the memory and the one or more processors configured to perform the method of one or more Aspects of Aspects 1-42.

Aspect 45: An apparatus for wireless communication, comprising at least one means for performing the method of one or more Aspects of Aspects 1-42.

Aspect 46: A non-transitory computer-readable medium storing code for wireless communication, the code comprising instructions executable by a processor to perform the method of one or more Aspects of Aspects 1-42.

Aspect 47: A non-transitory computer-readable medium storing a set of instructions for wireless communication, the set of instructions comprising one or more instructions that, when executed by one or more processors of a device, cause the device to perform the method of one or more Aspects of Aspects 1-42.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a remote user equipment (UE), comprising:
receiving, from a base station and via an access link between the remote UE and the base station, a communication that includes an indication of a resource allocation associated with a sidelink channel between the remote UE and a relay UE for transmitting feedback to the base station via the relay UE,
wherein the feedback is associated with the access link between the remote UE and the base station; and transmitting, by the remote UE, the feedback on the resource allocation associated with the sidelink channel toward the base station via the relay UE, wherein the feedback indicates whether the remote UE successfully received the communication from the base station via the access link.

2. The method of claim 1, wherein the sidelink channel is a physical sidelink shared channel, and wherein the method further comprises:
transmitting the feedback using medium access control signaling.

3. The method of claim 1, wherein the method further comprises:
transmitting the feedback using sidelink control information.

4. The method of claim 3, wherein the sidelink control information uses a format associated with carrying uplink control information (UCI) on the access link between the remote UE and the base station.

5. The method of claim 1, wherein the sidelink channel is a physical sidelink feedback channel.

6. The method of claim 5, wherein a physical sidelink feedback channel resource used to transmit the feedback is based at least in part on an uplink resource associated with a payload of the feedback.

7. The method of claim 6, further comprising:
identifying the physical sidelink feedback channel resource based at least in part on at least:
a slot or subslot associated with the uplink resource,
a resource set associated with the uplink resource,
the uplink resource,
a physical uplink control channel format associated with the payload,
a timing parameter of the feedback or the payload,
a time gap or frequency resource of the physical sidelink feedback channel resource, or
a combination thereof.

8. The method of claim 7, wherein identifying the physical sidelink feedback channel resource is based at least in part on a physical uplink control channel configuration associated with the payload.

9. The method of claim 1, wherein the indication of the resource allocation is based at least in part on a resource associated with a physical downlink control channel, a control resource set, or a physical downlink shared channel, and a gap between the resource and the resource allocation.

10. The method of claim 9, wherein the gap between the resource and the resource allocation is based at least in part on a minimum processing time of the relay UE.

11. The method of claim 1, wherein the resource allocation is specific to the remote UE based at least in part on the remote UE being on the sidelink channel.

12. The method of claim 1, wherein the communication comprises downlink control information (DCI).

13. The method of claim 12, wherein the DCI is associated with selecting a link for the feedback.

14. The method of claim 12, wherein the DCI indicates a time resource and a frequency resource for the feedback.

15. The method of claim 12, wherein the DCI indicates a time resource for the feedback, and wherein a frequency resource for the feedback is indicated semi-statically.

16. The method of claim 12, wherein the DCI indicates a time resource for the feedback, and wherein a frequency resource for the feedback is based at least in part on at least:
the time resource,
a slot associated with the DCI, or
a combination thereof.

17. The method of claim 12, wherein the DCI indicates a frequency resource for the feedback and a time gap for determining a time resource for the feedback.

18. The method of claim 12, wherein the DCI indicates a physical sidelink feedback channel resource and a physical sidelink feedback channel format for the feedback.

19. The method of claim 1, wherein the resource allocation associated with the sidelink channel for the feedback is selected from a resource pool associated with feedback,
wherein the resource pool is included in a set of resource pools that are associated with transmitting feedback to the base station, and
wherein the indication of the resource allocation indicates the resource pool or a carrier for the resource allocation.

20. The method of claim 1, wherein the resource allocation associated with the sidelink channel for the feedback is selected from a proper subset of a resource pool associated with transmitting feedback to the base station.

21. The method of claim 20, wherein the indication of the resource allocation associated with the sidelink channel for the feedback indicates a resource, of the resource pool associated with transmitting feedback to the base station, for the feedback.

22. A method of wireless communication performed by a base station, comprising:
selecting, on a sidelink of a remote user equipment (UE), a sidelink channel between the remote UE and a relay UE for feedback to be transmitted by the remote UE to the base station via the relay UE,
wherein the feedback is associated with an access link between the remote UE and the base station;
transmitting, to the remote UE and via the access link between the remote UE and the base station, a communication that includes an indication of a resource allocation associated with the sidelink channel for transmitting the feedback to the base station via the relay UE; and
receiving, from the remote UE and via the relay UE, the feedback, wherein the feedback indicates whether the remote UE successfully received the communication from the base station via the access link.

23. The method of claim 22, wherein the sidelink channel is a physical sidelink shared channel, and wherein receiving the feedback comprises:
receiving the feedback using medium access control signaling.

24. The method of claim 22, wherein receiving the feedback comprises:
receiving the feedback using sidelink control information.

25. The method of claim 22, wherein the indication of the resource allocation is based at least in part on a resource associated with a physical downlink control channel, a control resource set, or a physical downlink shared channel, and a gap between the resource and the resource allocation.

26. The method of claim 22, wherein the resource allocation associated with the sidelink channel is selected from a resource pool associated with transmitting feedback to the base station via the relay UE, wherein the resource pool is included in a set of resource pools that are associated with transmitting feedback to the base station via the relay UE, and wherein the indication of the resource allocation indicates the resource pool or a carrier for the resource allocation.

27. A base station for wireless communication, comprising:

one or more memories; and one or more processors coupled to the one or more memories, the one or more processors individually or collectively configured to:

select, on a sidelink of a remote user equipment (UE), a sidelink channel between the remote UE and a relay UE for transmitting feedback to the base station via the relay UE, wherein the feedback is associated with an access link between the remote UE;

transmit, to the remote UE and via the access link between the remote UE and the base station, an indication of a resource allocation associated with the sidelink channel for transmitting the feedback to the base station via the relay UE; and receive, from the remote UE and via the relay UE, the feedback, wherein the feedback indicates whether the remote UE successfully received the indication of the resource allocation from the base station via the access link.

28. The base station of claim 27, wherein the sidelink channel is a physical sidelink shared channel, and wherein the one or more processors, to receive the feedback, are configured to:

receive the feedback using medium access control signaling or sidelink control information.

29. A remote user equipment (UE) for wireless communication, comprising:

one or more memories; and one or more processors coupled to the one or more memories, the one or more processors individually or collectively configured to:

receive, from a base station via an access link between the remote UE and the base station, a communication that includes an indication of a resource allocation associated with a sidelink channel between the remote UE and a relay UE for feedback to the base station via the relay UE, wherein the feedback is associated with the access link between the remote UE and the base station; and transmit, toward the base station and via the relay UE, the feedback on the resource allocation associated with the sidelink channel, wherein the feedback indicates whether the remote UE successfully received the communication from the base station via the access link.

30. The remote UE of claim 29, wherein the sidelink channel is a physical sidelink feedback channel.

* * * * *